US010771214B2

United States Patent
Zhang

(10) Patent No.: US 10,771,214 B2
(45) Date of Patent: Sep. 8, 2020

(54) SYSTEM AND METHOD FOR UPLINK POWER CONTRL FRAMEWORK

(71) Applicant: Apple Inc., Cupertino, CA (US)

(72) Inventor: Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,887

(22) Filed: Sep. 11, 2018

(65) Prior Publication Data

US 2019/0044681 A1  Feb. 7, 2019

Related U.S. Application Data

(63) Continuation of application No. PCT/CN2017/101275, filed on Sep. 11, 2017, and a
(Continued)

(51) Int. Cl.
| | | |
|---|---|---|
| *H04L 5/00* | (2006.01) | |
| *H04W 52/24* | (2009.01) | |
| *H04B 7/0408* | (2017.01) | |
| *H04L 25/02* | (2006.01) | |
| *H04B 7/04* | (2017.01) | |

(Continued)

(52) U.S. Cl.
CPC ............. *H04L 5/0048* (2013.01); *H04B 7/04* (2013.01); *H04B 7/0408* (2013.01); *H04L 5/001* (2013.01); *H04L 5/0032* (2013.01); *H04L 5/0094* (2013.01); *H04L 25/02* (2013.01); *H04W 52/242* (2013.01); *H04L 5/006* (2013.01); *H04L 5/0023* (2013.01); *H04W 52/08* (2013.01);
(Continued)

(58) Field of Classification Search
CPC ...... H04B 7/04; H04B 7/0408; H04B 7/0695; H04B 7/088; H04L 5/001; H04L 5/0023; H04L 5/0032; H04L 5/0048; H04L 5/006; H04L 5/0094; H04W 52/02; H04W 52/04; H04W 52/08; H04W 52/10; H04W 52/142; H04W 52/146; H04W 52/221; H04W 52/242; H04W 52/248; H04W 52/32; H04W 52/325; H04W 52/34; H04W 52/365; H04W 52/367; H04W 52/58; H04W 72/0413
See application file for complete search history.

(56) References Cited

U.S. PATENT DOCUMENTS 8,811,287 B2 * 8/2014 Noh ................. H04L 5/0048
370/328
8,885,589 B2 * 11/2014 Kim ................. H04L 5/0091
370/329
(Continued)

OTHER PUBLICATIONS

Huawei et al., Power control for CA and DC, Jan. 20, 2017, 3GPP, 3GPP TSG RAN WG1 NR Ad Hoc Meeting, Tdoc: R1-1700009 (Year: 2017).*
(Continued)

*Primary Examiner* — Eric Nowlin
(74) *Attorney, Agent, or Firm* — Kowert, Hood, Munyon, Rankin & Goetzel, P.C.

(57) ABSTRACT

Systems, apparatuses, methods, and computer-readable media, for an uplink power control framework are described. Embodiments may include power control for physical uplink shared channel (PUSCH) and power control for sounding reference signals (SRS). Other embodiments may be described and/or claimed.

20 Claims, 9 Drawing Sheets

Related U.S. Application Data continuation of application No. PCT/CN2018/082069, filed on Apr. 5, 2018, and a continuation of application No. PCT/CN2018/083183, filed on Apr. 16, 2018.

(51) Int. Cl.
    *H04W 52/08*     (2009.01)
    *H04W 52/14*     (2009.01)
    *H04W 52/32*     (2009.01)

(52) U.S. Cl.
    CPC ........ *H04W 52/146* (2013.01); *H04W 52/325* (2013.01)

(56) References Cited

U.S. PATENT DOCUMENTS

| | | | |
|---|---|---|---|
| 8,954,064 B2* | 2/2015 | Baldemair | H04L 5/0053 455/434 |
| 9,088,978 B2* | 7/2015 | Frenne | H04W 72/0406 |
| 9,130,717 B2* | 9/2015 | Kim | H04L 5/0091 |
| 9,642,114 B2* | 5/2017 | Fong | H04W 4/70 |
| 10,271,325 B2* | 4/2019 | Mukherjee | H04W 74/0816 |
| 10,341,961 B2* | 7/2019 | Cheng | H04W 72/0406 |
| 10,355,830 B2* | 7/2019 | Wiemann | H04W 72/14 |
| 2014/0071909 A1* | 3/2014 | Frenne | H04L 5/0091 370/329 |
| 2014/0078934 A1* | 3/2014 | Hugl | H04B 7/024 370/254 |
| 2015/0043524 A1* | 2/2015 | Kim | H04L 5/0091 370/330 |
| 2015/0092719 A1* | 4/2015 | Baldemair | H04L 5/0053 370/329 |
| 2015/0334735 A1* | 11/2015 | Chang | H04W 4/70 370/329 |
| 2016/0143014 A1* | 5/2016 | Mukherjee | H04W 74/0816 370/330 |
| 2016/0242125 A1* | 8/2016 | Lee | H04W 52/246 |
| 2016/0255593 A1* | 9/2016 | Blankenship | H04W 52/146 370/328 |
| 2017/0086176 A1* | 3/2017 | Seo | H04L 1/00 |
| 2017/0163388 A1* | 6/2017 | Wiemann | H04L 1/1861 |
| 2017/0222749 A1* | 8/2017 | Dinan | H04L 1/0023 |
| 2018/0063822 A1* | 3/2018 | Guo | H04W 72/04 |
| 2018/0123744 A1* | 5/2018 | Nogami | H04W 52/146 |
| 2018/0310257 A1* | 10/2018 | Papasakellariou | H04W 52/30 |
| 2018/0324708 A1* | 11/2018 | Cheng | H04L 5/0048 |
| 2018/0359711 A1* | 12/2018 | Akkarakaran | H04W 52/325 |
| 2019/0044681 A1* | 2/2019 | Zhang | H04L 5/0048 |
| 2019/0174466 A1* | 6/2019 | Zhang | H04L 5/0048 |
| 2019/0190747 A1* | 6/2019 | Park | H04L 5/005 |
| 2019/0268971 A1* | 8/2019 | Talarico | H04L 5/0048 |
| 2019/0281588 A1* | 9/2019 | Zhang | H04L 5/0051 |
| 2019/0297582 A1* | 9/2019 | Lin | H04W 52/14 |
| 2020/0029262 A1* | 1/2020 | Kim | H04W 36/0094 |
| 2020/0068497 A1* | 2/2020 | Gong | H04W 52/146 |

OTHER PUBLICATIONS

Huawei et al., General discussion of UL power control for NR, Jan. 20, 2017, 3GPP, 3GPP TSG RAN WG1 NR Ad Hoc Meeting, Tdoc: R1-1700063 (Year: 2017).*
Huawei et al., Detailed considerations on UL power control design for NR, Jan. 20, 2017, 3GPP, 3GPP TSG RAN WG1 NR Ad Hoc Meeting, Tdoc: R1-1700064 (Year: 2017).*
Zte et al., Discussion on UL power control for NR, Jan. 20, 2017, 3GPP, 3GPP TSG RAN WG1 NR Ad-Hoc Meeting, Tdoc: R1-1700142 (Year: 2017).*
Intel Corporation, on Uplink Power Control, Jan. 20, 2017, 3GPP, 3GPP TSG RAN WG1 NR Ad-Hoc Meeting, Tdoc: R1-1700358 (Year: 2017).*
LG Electronics, Discussion on UL transmit power control for NR, Jan. 20, 2017, 3GPP, 3GPP TSG RAN WG1 NR Ad-Hoc Meeting, Tdoc: R1-1700492 (Year: 2017).*
Guangdong OPPO Mobile Telecom, Uplink power control for NR, Jan. 20, 2017, 3GPP, 3GPP TSG RAN WG1 NR-Adhoc, Tdoc: R1-1700553 (Year: 2017).*
NTT DOCOMO, INC., Uplink power control considering waveform switching, Jan. 20, 2017, 3GPP, 3GPP TSG-RAN WG1-NR, Tdoc: R1-1700601 (Year: 2017).*
ASUSTeK, UL power control in multi-beam based approaches, Jan. 20, 2017, 3GPP, 3GPP TSG RAN WG1 AH_NR Meeting, Tdoc: R1-1700868 (Year: 2017).*
Samsung, UL Power Control Aspects, Jan. 20, 2017, 3GPP, 3GPP TSG RAN WG1 NR Ad-Hoc Meeting, Tdoc: R1-1700940 (Year: 2017).*
Samsung, UL Power Control for CA with Different Numerologies, Jan. 20, 2017, 3GPP, 3GPP TSG RAN WG1 Ad-Hoc Meeting, Tdoc: R1-1700963 (Year: 2017).*
Nokia et al., UL Interference Coordination and Power Control, Jan. 20, 2017, 3GPP, 3GPP TSG-RAN WG1#NR, Tdoc: R1-1701147 (Year: 2017).*
Nokia et al., WF on uplink power control, Jan. 20, 2017, 3GPP, 3GPP TSGRAN1 NR Ad-Hoc, Tdoc: R1-1701513 (Year: 2017).*
Huawei et al., General discussion of UL power control for NR, Feb. 17, 2017, 3GPP, 3GPP TSG RAN WG1 Meeting #88, Tdoc: R1-1701687 (Year: 2017).*
Huawei et al., Detailed considerations on UL power control design for NR, Feb. 17, 2017, 3GPP, 3GPP TSG RAN WG1 Meeting #88, Tdoc: R1-1701688 (Year: 2017).*
Huawei et al., UL power control for short TTI, Feb. 17, 2017, 3GPP, 3GPP TSG RAN WG1 Meeting #88, Tdoc: R1-1701738 (Year: 2017).*
Zte et al., Discussion on UL power control for NR, Feb. 17, 2017, 3GPP, 3GPP TSG RAN WG1 Meeting #88, Tdoc: R1-1701822 (Year: 2017).*
Intel Corporation, On UL Power Control, Feb. 17, 2017, 3GPP, 3GPP TSG-RAN WG1 #88, Tdoc: R1-1702216 (Year: 2017).*
Qualcomm Incorporated, Clarification on LTE Rel-8 UL power control, Feb. 17, 2017, 3GPP, 3GPP TSG RAN WG1 #88, Tdoc: R1-1702506 (Year: 2017).*
Samsung, UL Power Control Aspects, Feb. 17, 2017, 3GPP, 3GPP TSG RAN WG1 Meeting #88, Tdoc: R1-1702964 (Year: 2017).*
ASUSTeK, UL power control in multi-beam based approaches, Jan. 20, 2017, 3GPP, 3GPP TSG RAN WG1 AH_NR Meeting, Tdoc: R1-1703052 (Year: 2017).*
Nokia et al., UL Power Control for MIMO, Feb. 17, 2017, 3GPP, 3GPP TSG RAN WG1 Meeting #88, Tdoc: R1-1703185 (Year: 2017).*
Nokia et al., WF on uplink power control, Feb. 17, 2017, 3GPP, 3GPP TSG RAN WG1 Meeting RAN1 #88, Tdoc: R1-1703835 (Year: 2017).*
ZTE, On NR power control, Aug. 25, 2017, 3GPP, 3GPP TSG RAN WG1 Meeting #90, Tdoc: R1-1712312 (Year: 2017).*
CATT, NR Power Control Framework, Aug. 25, 2017, 3GPP, 3GPP TSG RAN WG1 RAN1#90, Tdoc: R1-1712440 (Year: 2017).*
Intel Corporation, Discussion On UL Power Control Framework, Aug. 25, 2017, 3GPP, 3GPP TSG RAN WG1 Meeting #90, Tdoc: R1-1712613 (Year: 2017).*
Vivo, NR UL power control framework, Aug. 25, 2017, 3GPP, 3GPP TSG RAN WG1 Meeting #90, Tdoc: R1-1712874 (Year: 2017).*
LG Electronics, Consideration on UL power control process for NR, Aug. 25, 2017, 3GPP, 3GPP TSGRAN WG1 Meeting #90, Tdoc: R1-1713223 (Year: 2017).*
Samsung, Power Control Framework, Aug. 25, 2017, 3GPP, 3GPP TSG RAN WG1 Meeting #90, Tdoc: R1-1713672 (Year: 2017).*
NTT DOCOMO, INC., Power control framework for PUSCH, Aug. 25, 2017, 3GPP, 3GPP TSG RAN WG1 Meeting #90, Tdoc: R1-1713973 (Year: 2017).*
InterDigital Inc., Common and Beam Specific Power Control Parameters, Aug. 25, 2017, 3GPP, 3GPP TSG RAN WG1 Meeting #90, Tdoc: R1-1714170 (Year: 2017).*

(56) References Cited

OTHER PUBLICATIONS

Ericsson, On NR power control framework, Aug. 25, 2017, 3GPP, 3GPP TSG-RAN WG1 #90, Tdoc: R1-1714320 (Year: 2017).*
Nokia et al., Discussion on NR power control framework, Aug. 25, 2017, 3GPP, 3GPP TSG RAN WG1 Meeting #90, Tdoc: R1-1714362 (Year: 2017).*
ASUSTeK, Power control on different SRS groups, Aug. 25, 2017, 3GPP, 3GPP TSG RAN WG1 Meeting #90, Tdoc: R1-1714384 (Year: 2017).*
China Telecom, Some Consideration on UL Power Control for uplink sharing, Aug. 25, 2017, 3GPP, 3GPP TSG-RAN WG1 Meeting #90, Tdoc: R1-1714485 (Year: 2017).*
ZTE, Offline summary for AI 6.1.7 NR UL power control, Aug. 25, 2017, 3GPP, 3GPP TSG RAN WG1 Meeting #90, Tdoc: R1-1714930 (Year: 2017).*

* cited by examiner

SYSTEM AND METHOD FOR UPLINK POWER CONTRL FRAMEWORK

PRIORITY CLAIM

This application claims the benefit of priority to and is a continuation under 35 U.S.C. 111(a) of International Application No. PCT/CN2017/101275, filed on Sep. 11, 2017, entitled "UPLINK POWER CONTROL FRAMEWORK"; International Application No. PCT/CN2018/082069, filed on Apr. 5, 2018, entitled "UPLINK POWER CONTROL FRAMEWORK"; and International Application No. PCT/CN2018/083183, filed on Apr. 16, 2018, entitled "UPLINK POWER CONTROL FRAMEWORK", each of which is incorporated herein by reference in its entirety.

TECHNICAL FIELD

Various embodiments herein generally relate to the field of wireless communications, and more particularly, to system and method for uplink power control framework.

BACKGROUND

Wireless systems typically include multiple User Equipment (UE) devices communicatively coupled to one or more Base Stations (BS). The one or more BSs may be Long Term Evolved (LTE) evolved NodeBs (eNBs) or New Radio (NR) next generation NodeBs (gNBs) that can be communicatively coupled to one or more UEs by a Third-Generation Partnership Project (3GPP) network. The UE may be one or more of a smart phone, a tablet computing device, a laptop computer, an internet of things (IoT) device, and/or another type of computing devices that is configured to provide digital communications. As used herein, digital communications can include data and/or voice communications, as well as control information.

For the 5G system, the multi-beam operation may be used for the high band (>6 GHz) to increase the link budget. Then different path loss may be observed in different gNB-UE beam pair links (BPLs). In the low band (<=6 GHz), the single-beam operation may be used. Thus, it may be desirable to define a general uplink power control framework for both high band and low band. Moreover, for high band, multiple Sounding Reference Signal (SRS) may be used for uplink beam management, where different BPLs can be applied to different resources. Further, some SRS resources may be used for link adaptation as well. Thus, it may be also desirable to define a uniform power control framework for different SRS resource sets.

BRIEF DESCRIPTION OF THE FIGURES

Features and advantages of the disclosure will be apparent from the detailed description which follows, taken in conjunction with the accompanying drawings, which together illustrate, by way of example, features of the disclosure; and, wherein.

Figure 1:
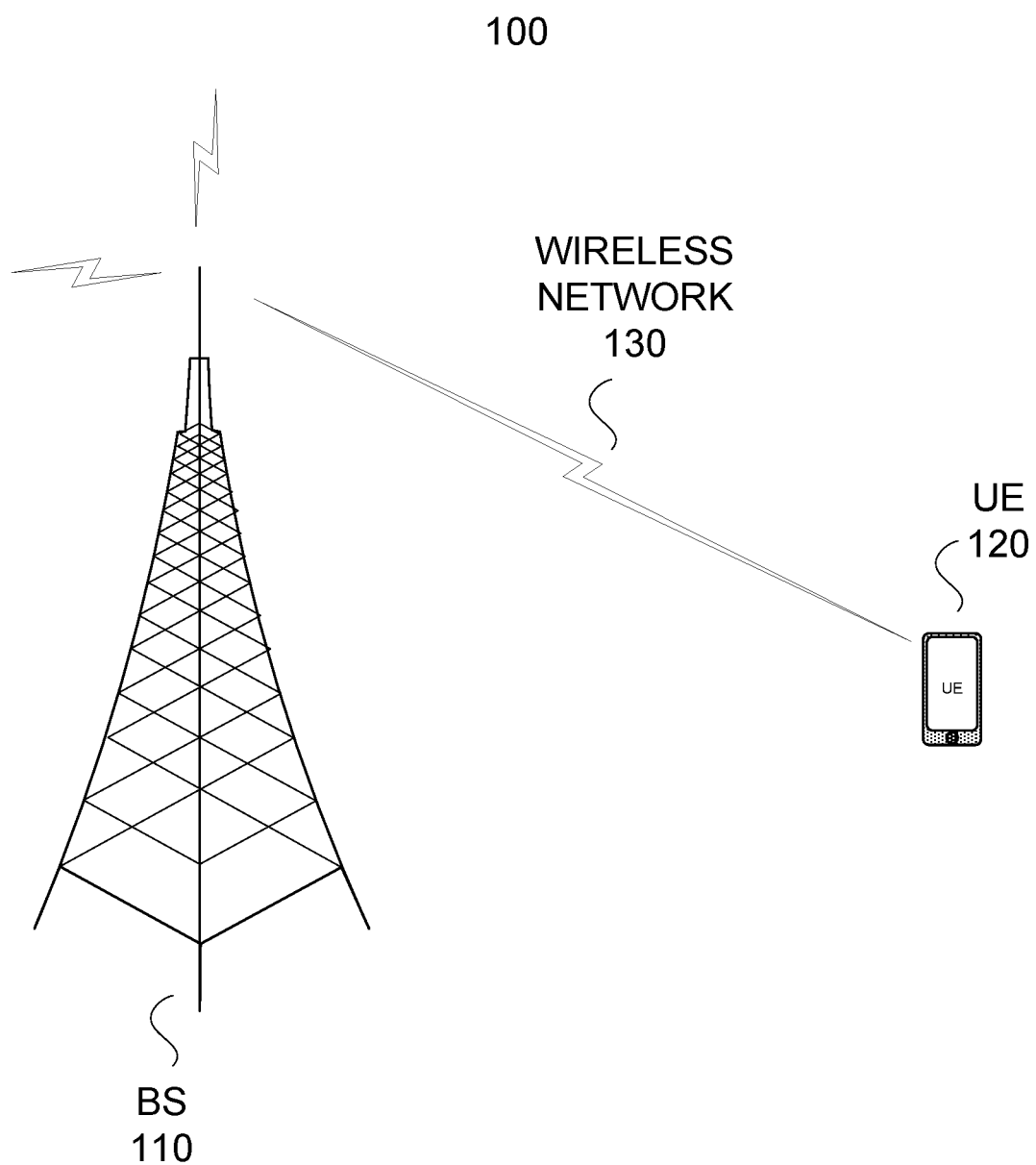
FIG. 1 illustrates a wireless system in accordance with some embodiments.

Reference will now be made to the exemplary embodiments illustrated, and specific language will be used herein to describe the same. It will nevertheless be understood that no limitation of the scope of the technology is thereby intended.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed embodiments. However, it will be apparent to those skilled in the art having the benefit of the present disclosure that the various aspects of the embodiments claimed may be practiced in other examples that depart from these specific details. In certain instances, descriptions of well-known devices, circuits, and methods are omitted so as not to obscure the description of embodiments of the present disclosure with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments. However, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A or B" means (A), (B), or (A and B).

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

As used herein, the term "processor" refers to, is part of, or includes circuitry capable of sequentially and automatically carrying out a sequence of arithmetic or logical operations; recording, storing, and/or transferring digital data. The term "processor" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface" refers to, is part of, or includes circuitry providing for the exchange of information between two or more components or devices. The term "interface" may refer to one or more hardware interfaces (for example, buses, input/output (I/O) interfaces, peripheral component interfaces, and the like).

FIG. 1 illustrates a wireless system in accordance with some embodiments. In one aspect, the wireless system 100 includes one or more Base Stations (BS) 110 and one or more User Equipment (UE) devices 120 that can be communicatively coupled by a wireless communication protocol. In one instance, the one or more BSs may be Long Term Evolved (LTE) evolved NodeBs (eNBs) or New Radio (NR) next generation NodeBs (gNBs) that can be communicatively coupled to one or more UEs by a Third-Generation Partnership Project (3GPP) Long Term Evolved (LTE) network 130. In one instance, the UE may be one or more of a smart phone, a tablet computing device, a laptop computer, an internet of things (IoT) device, and/or another type of computing devices that is configured to provide digital communications. As used herein, digital communications may include data and/or voice communications, as well as control information.

For the 5G system, the multi-beam operation may be used for the high band (>6 GHz) to increase the link budget. Then different path loss may be observed in different gNB-UE beam pair links (BPLs). In the low band (<=6 GHz), the single-beam operation may be used. Then how to define a general uplink power control framework for both high band and low band can be one issue.

For high band, multiple Sounding Reference Signal (SRS) may be used for uplink beam management, where different BPLs can be applied to different resources. Further, some SRS resources may be used for link adaptation as well. Then how to define a uniform power control framework for different SRS resource sets can be one issue.

Embodiments herein thus will describe power control for physical uplink shared channel (PUSCH) and power control for sounding reference signals (SRSs).

Power Control for PUSCH

For PUSCH, there may be a set of SRS resources maintained between the gNB and UE. In different SRS resources, different gNB and/or UE beams may be used. Thus, the power control factors for each SRS resource may be different.

In some embodiments, the gNB may use a SRS resource indicator (SRI) to indicate which of SRS resources is assigned to the UE. The SRI may be transmitted by the gNB to the UE. In some embodiments, each SRS resource may be associated with different sets of power control factors, such as resource block power ($P_0$), path loss compensation factor ($\alpha$), and closed-loop power control factor (f). The mapping of the power control factors and the SRI may be configured by, for example, higher layer signaling. In an example, the UE may obtain these power control factors by decoding the higher layer signaling.

In addition to power control factors, the UE may estimate the path loss in order to determine the transmission power of PUSCH. In some embodiments, in a SRS resource, the gNB may identify a Channel State Information Reference Signal (CSI-RS) Resource Index (CRI) for the UE to measure the path loss for uplink power control if CSI-RS is configured. Alternatively, the gNB may identify a Synchronization Signal Block (SS-block) index for the UE to measure the path loss. Before UE receives the SRS resource configuration, the UE may use a SS-block to estimate the path loss. Then for a SRS resource k, the transmission power of PUSCH at slot i and cell c can be given by:

$$P_{PUSCH,c}(i) = \min \left\{ \begin{array}{l} P_{CMAX,c}(i), \\ 10\log_{10}(M_{PUSCH,c}(i)) + P_{0,PUSCH}(k) + \\ \alpha(k) \times PL(k) + \Delta_{TF,c}(i) + f_k(i) \end{array} \right\} [dBm] \quad (1)$$

where $P_{CMAX,c}(i)$ may be the configured UE transmission power, $M_{PUSCH,c}(i)$ may indicate allocated bandwidth for PUSCH expressed as number of subcarriers or resource blocks based on current subcarrier spacing or a reference subcarrier spacing, $P_{0,PUSCH}(k)$ may indicate resource block power configured for SRS resource k, $\alpha(k)$ may indicate path loss compensation factor configured for SRS resource k, PL(k) may be the path loss estimated from the configured SS-block or CSI-RS for SRS resource k, $\Delta_{TF,c}(i)$ may be the same as defined in LTE, and $f_k(i)$ may be the closed-loop power control factor for SRS resource k.

Figure 2:
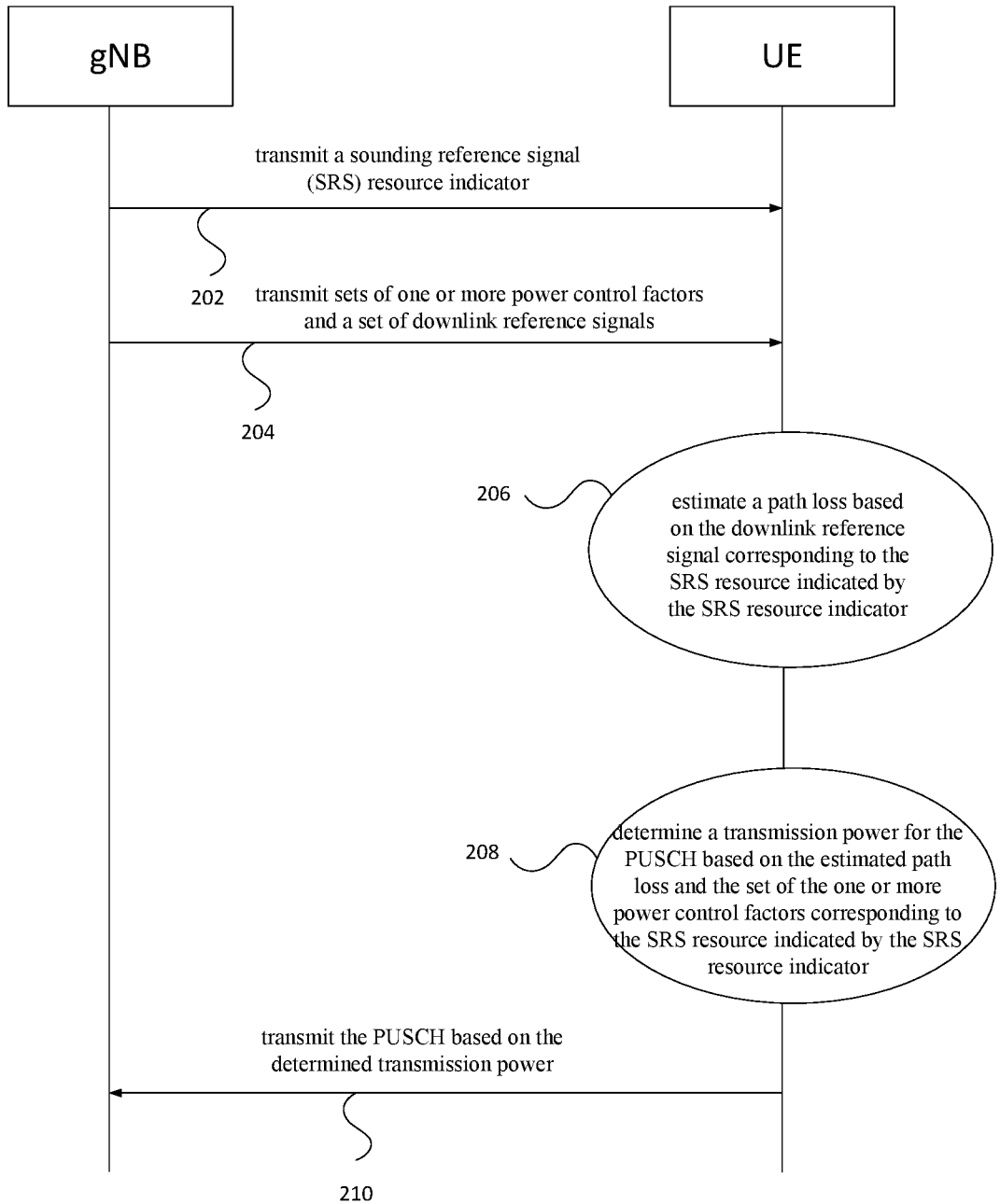
FIG. 2 illustrates a method to be performed by a User Equipment (UE) of configuring transmission power for physical uplink shared channel (PUSCH) in accordance with some embodiments.

FIG. 2 illustrates a method to be performed by a User Equipment (UE) of configuring transmission power for physical uplink shared channel (PUSCH) in accordance with some embodiments. At 202, the UE may receive a sounding reference signal (SRS) resource indicator (SRI) from a gNB. In an example, the SRI may indicate one of a set of SRS resources maintained between the gNB and the UE. In another example, the SRI may indicate more than one of the set of SRS resources that have the same power control configuration, such as power control factors.

At 204, sets of one or more power control factors and a set of downlink reference signals may be transmitted from the gNB to the UE. In some embodiments, the UE may decode the sets of the one or more power control factors and the set of downlink reference signals from higher layer signaling received from the gNB. For instance, in case of one or more power control factors, the UE may decode one or more of a resource block power ($P_0$), a path loss compensation factor ($\alpha$), and a closed-loop power control factor (f). In some embodiments, each set of the one or more power control factors and each of the downlink reference signals may be mapped to each SRS resource. For example, a first set of the one or more power control factors and a first downlink reference signal may be configured for a first SRS resource, and a second set of the one or more power control factors and a second downlink reference signal may be configured for a second SRS resource. In some embodiments, one or more of the resource block power, the path loss compensation factor, the closed-loop power control factor and the downlink reference signal are different in different SRS resources.

In some embodiments, the higher layer signaling may be encoded in Radio Resource Control (RRC) signaling or Medium Access Control (MAC) Control Element (CE).

At 206, the UE may estimate a path loss based on the downlink reference signal corresponding to the SRS resource indicated by the SRS resource indicator. As previously indicated, the downlink reference signal for path loss estimation may include a channel state information reference signal (CSI-RS) or a synchronization signal block (SS-block) that is configured for each SRS resource. In some embodiments, the UE may be configured with multiple bandwidth parts (BWPs) or multiple Component Carriers (CCs). In these embodiments, the BWP index and CC index may be configured as well for the DL reference signal. Below is an example configuration for the mapping of power control DL reference signal and SRI.

```
PUSCH-PathlossReferenceRS : :=          SEQUENCE {
    pusch-PathlossReferenceRS-Id            PUSCH-
PathlossReferenceRS-Id,
    referenceSignal                         CHOICE {
        ssb-Index                               SSB-Index,
        csi-RS-Index                            NZP-CSI-
RS-ResourceId
    }
    cell                                    ServCellIndex
    bwp-Id                                  BWP-Id          Optional
}
SRI-PUSCH-PowerControl : : =            SEQUENCE {
    sri-PUSCH-PathlossReferenceRS-Id        PUSCH-
PathlossReferenceRS-Id,
}
```

At 208, the UE may determine a transmission power for the PUSCH based on the estimated path loss and the set of the one or more power control factors corresponding to the SRS resource indicated by the SRS resource indicator.

At 210, the UE may transmit the PUSCH based on the determined transmission power.

Power Control for SRS

When searching for a good gNB-UE beam pair by beam sweeping, the UE may use the same Tx power for each time instance or repetition of SRS. One possible way is to use the maximum transmit power. However, this would increase the inter-cell interference and it would be challenging to multiplex multiple UEs in one SRS, since some far UEs may not be received due to interference from near UEs. Therefore, the power control for SRS may be necessary and it may be common for each repetitions.

There may be two types of SRS: one is used for beam management; the other is used for link adaptation. Different types of SRS may be configured in different SRS resource sets.

In some embodiments, the power control of SRS may be SRS resource set specific. In these embodiments, the gNB may use a SRS resource set index to indicate a SRS resource set which has common power control factors, such as resource block power ($P_0$), path loss compensation factor ($\alpha$), and closed-loop power control factor (f). The SRS resource set index may be transmitted by the gNB to the UE.

In an example, the SRS resource set index may be configured by higher layer signaling. In another example, the SRS resource set index may be configured by Downlink Control Information (DCI). In some embodiments, each SRS resource set may be associated with different sets of power control factors. The UE may obtain these power control factors by, for example, decoding the higher layer signaling.

In addition to power control factors, the UE may estimate the path loss in order to determine the transmission power of SRS. There may be the following options for path loss estimation: Option 1: path loss is calculated based on a particular SS-block or CSI-RS; or Option 2: path loss is calculated based on averaging of a sub-set of beams from SS-block or CSI-RS. Both options can help the UE to calculate a common Tx power for SRS. For option 1, the gNB may identify one SS-block or CSI-RS for the UE to measure the path loss. For option 2, the gNB may divided the beams into multiple sub-sets and configure the sub-set index. In another embodiment, in order to reduce the control signaling overhead, one possible way is to use the cell level RSRP. In this case, the gNB does not need to use additional signaling for the UE to identify the DL RS for measurement.

The transmission power of SRS for a SRS resource set g at slot i and cell c may be calculated as follows:

$$P_{PUSCH,c}(i) = \min \begin{Bmatrix} P_{CMAX,c}(i), \\ 10\log_{10}(M_{SRS,c}(i)) + P_{0,SRS}(g) + \\ \alpha(g)PL_g + P_{SRS\_offset}(g) + f_g(i) \end{Bmatrix} [dBm] \quad (2)$$

Where $P_{CMAX,c}(i)$ may be the configured UE transmission power, $M_{SRS,c}(i)$ may indicate the bandwidth for SRS expressed as number of RBs or subcarriers based on current subcarrier spacing or a reference subcarrier spacing, $P_{0,SRS}(g)$ may indicate a resource block power configured per SRS resource set g, $\alpha(g)$ may indicate a path loss compensation factor configured per SRS resource set g, and for link adaptation based SRS, it may be the same as PUSCH, $P_{SRS\_offset}(g)$ may denote the power control offset for SRS resource set g, and $f_g(i)$ may be the closed-loop power control factor for SRS resource set g.

Figure 3:
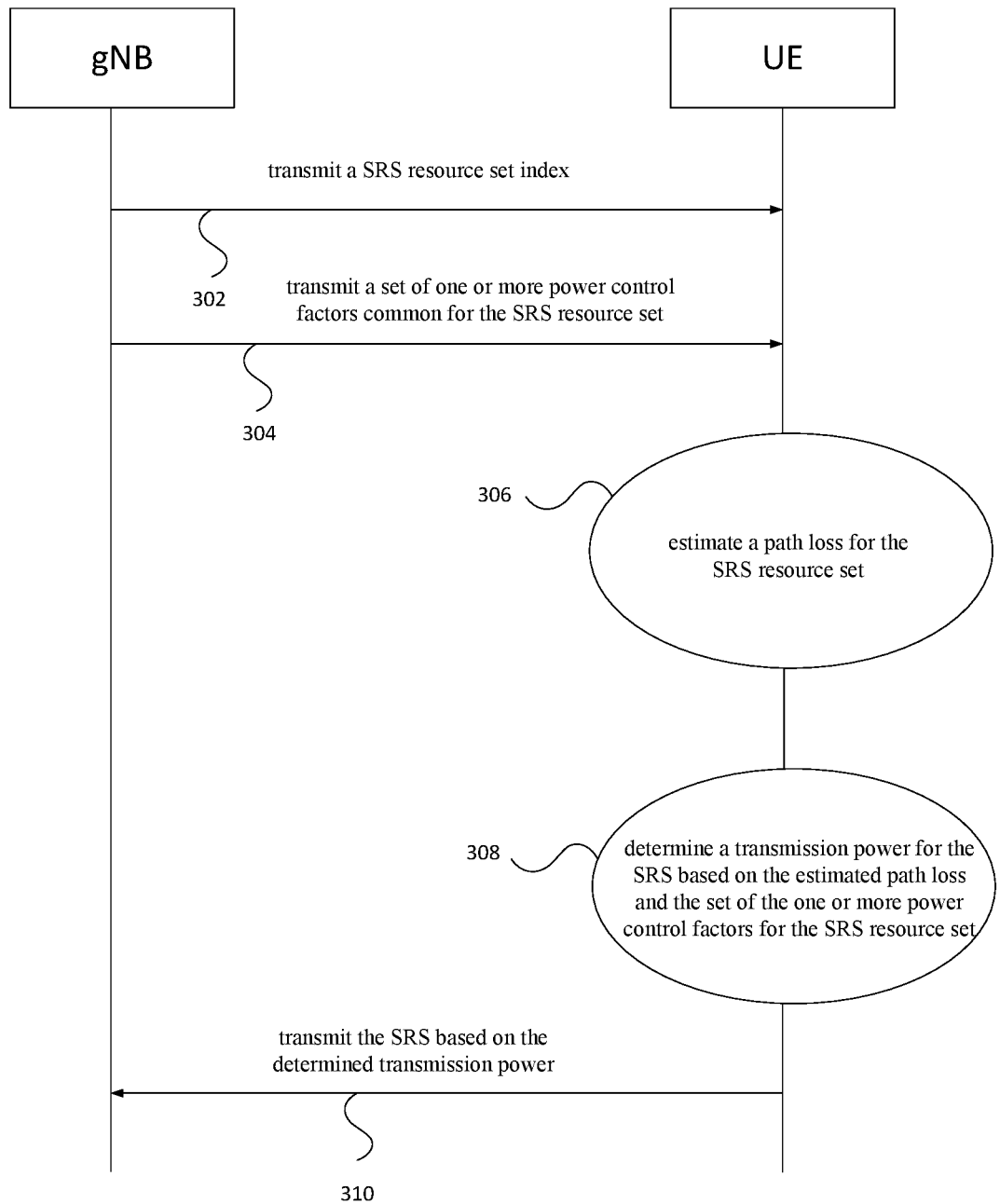
FIG. 3 illustrates a method to be performed by a User Equipment (UE) of configuring transmission power for sounding reference signal (SRS) in accordance with some embodiments.

FIG. 3 illustrates a method to be performed by a User Equipment (UE) of configuring transmission power for sounding reference signal (SRS) in accordance with some embodiments. At 302, the UE may receive a SRS resource set index from a gNB that indicates a SRS resource set. In some embodiments, the SRS resource set index may be configured by higher layer signaling or Downlink Control Information (DCI).

At 304, a set of one or more power control factors common for the SRS resource set may be transmitted from the gNB to the UE. In some embodiments, the UE may decode the set of one or more power control factors common for the SRS resource set from higher layer signaling received from the gNB. For instance, the UE may decode one or more of a resource block power ($P_0$), a path loss compensation factor ($\alpha$), and a closed-loop power control factor (f). Each SRS resource set may be associated with different sets of power control factors. In an example, a first set of the one or more power control factors may be configured for a first SRS resource set, and a second set of the one or more power control factors may be configured for a second SRS resource set. In some embodiments, one or more of the resource block power, the path loss compensation factor, the closed-loop power control factor are different in different SRS resource sets.

At 306, the UE may estimate a path loss for the SRS resource set. For each SRS resource set, the DL reference signal for path loss estimation may be configured. As previously indicated, the path loss may be estimated based on a particular SS-block or CSI-RS. Alternatively, the path loss may be estimated based on averaging of a sub-set of beams from SS-block or CSI-RS. In some embodiments, in order to reduce the control signaling overhead, one possible way is to use the cell level RSRP. In this case, the gNB may not need to use additional signaling for the UE to identify the DL RS for measurement.

In some embodiments, the UE may be configured multiple BWPs or CCs. In this case, the BWP index and/or CC index may be indicated by higher layer signaling as well. Below is an example for SRS power control parameter for DL RS.

| PUSCH-PathlossReferenceRS : := | | SEQUENCE { |
|---|---|---|
| pathlossReferenceRS | | CHOICE { |
| ssb-Index | | SSB-Index, |
| csi-RS-Index | | NZP-CSI-RS- |
| | | ResourceId |
| } | | |
| cell | ServCellIndex | |
| bwp-Id | BWP-Id | Optional |
| } | | |

At 308, the UE may determine a transmission power for the SRS based on the estimated path loss and the set of the one or more power control factors for the SRS resource set.

At 310, the UE may transmit the SRS based on the determined transmission power.

Closed-Loop Power Control

The closed-loop power control factor may be indicated by Downlink Control Indicator (DCI), where multiple power control factors TPC-Command are indicated. Then for each UE, since it may be configured with up to 2 closed-loop power control processes, the UE may make sure which closed-loop power control process this TPC-Command is for.

In some embodiments, a UE may be configured with one TPC-index by higher layer signaling, and it may use the N consecutive TPC-Command in the DCI starting from the TPC-Command k, where k is the value of TPC-index, and N is the number of closed-loop power control processes. Then the TPC-Command for each closed-loop power control processes may be mapped with increasing or decreasing order. For example, for 2 closed-loop power control processes case, TPC-Command k may be used for process 0 and TPC-Command k+1 may be used for process 1.

In some embodiments, the index for power control process may be determined by the CRC sequence for PDCCH carrying the DCI for TPC-Command indication. In an example, CRC sequence 0 may indicate power control process index 0 and CRC sequence 1 may indicate power control process index 1.

In some embodiments, the gNB may configure N TPC-index for a UE to search its TPC-Command for N power control processes, and each TPC-index may be used for each power control process.

Figure 4:
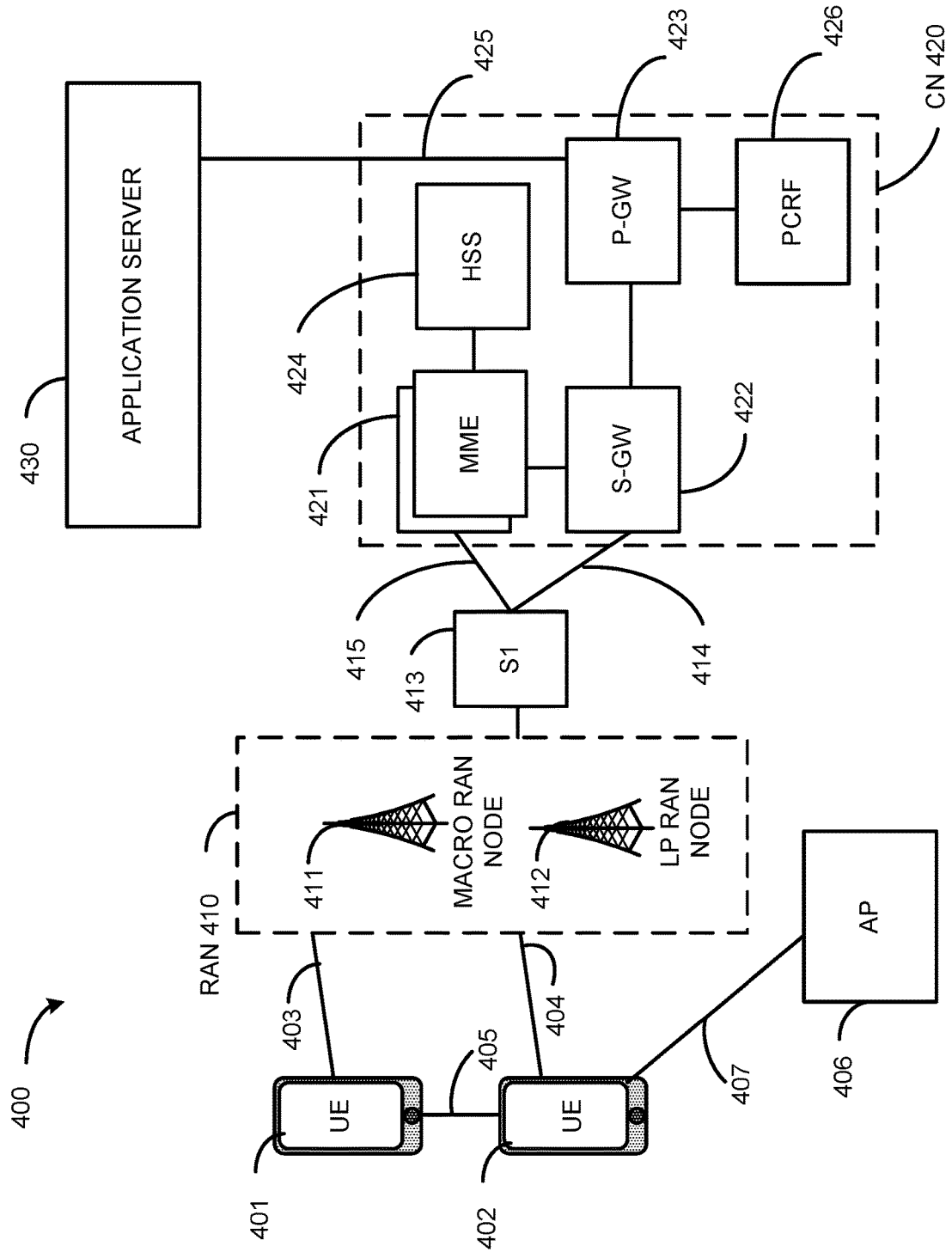
FIG. 4 illustrates an architecture of a system of a network in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMES 421, the S-GW 422, the Packet Data Network (PDN) Gateway (P-GW) 423, and a home subscriber server (HSS) 424. The MMES 421 may be similar in function to the control plane of legacy Serving General Packet Radio Service (GPRS) Support Nodes (SGSN). The MMES 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
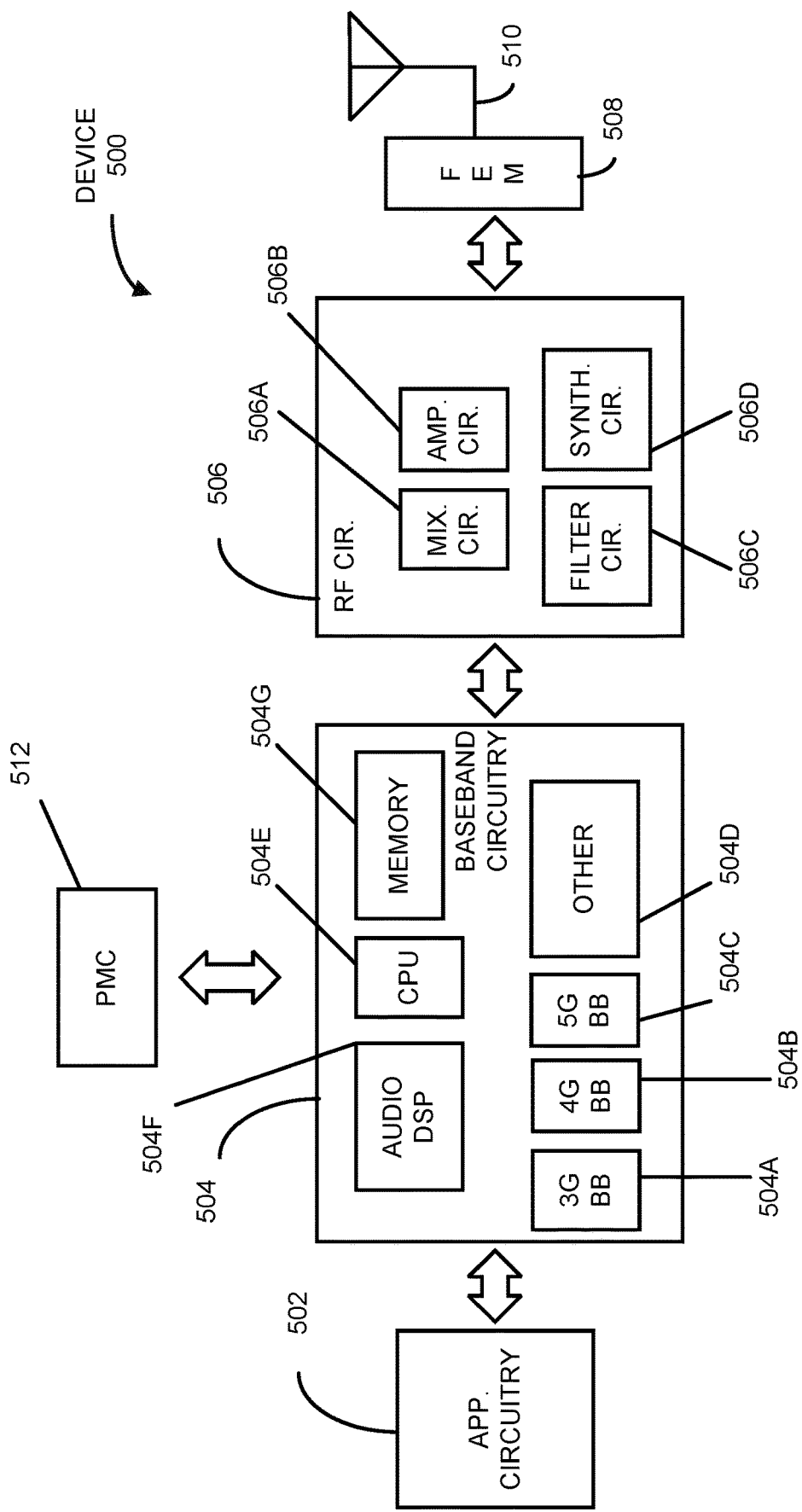
FIG. 5 illustrates example components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
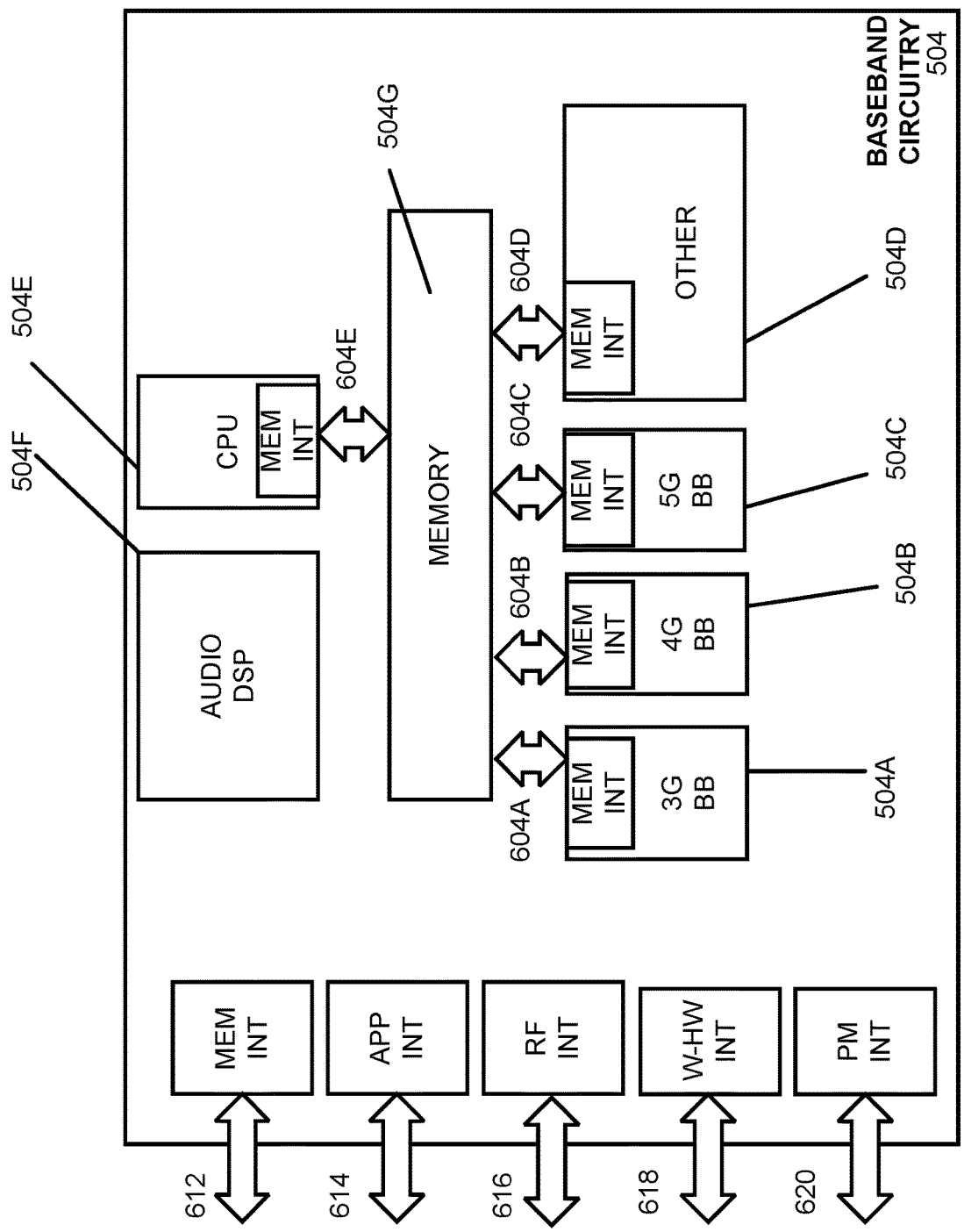
FIG. 6 illustrates example interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512).

Figure 7:
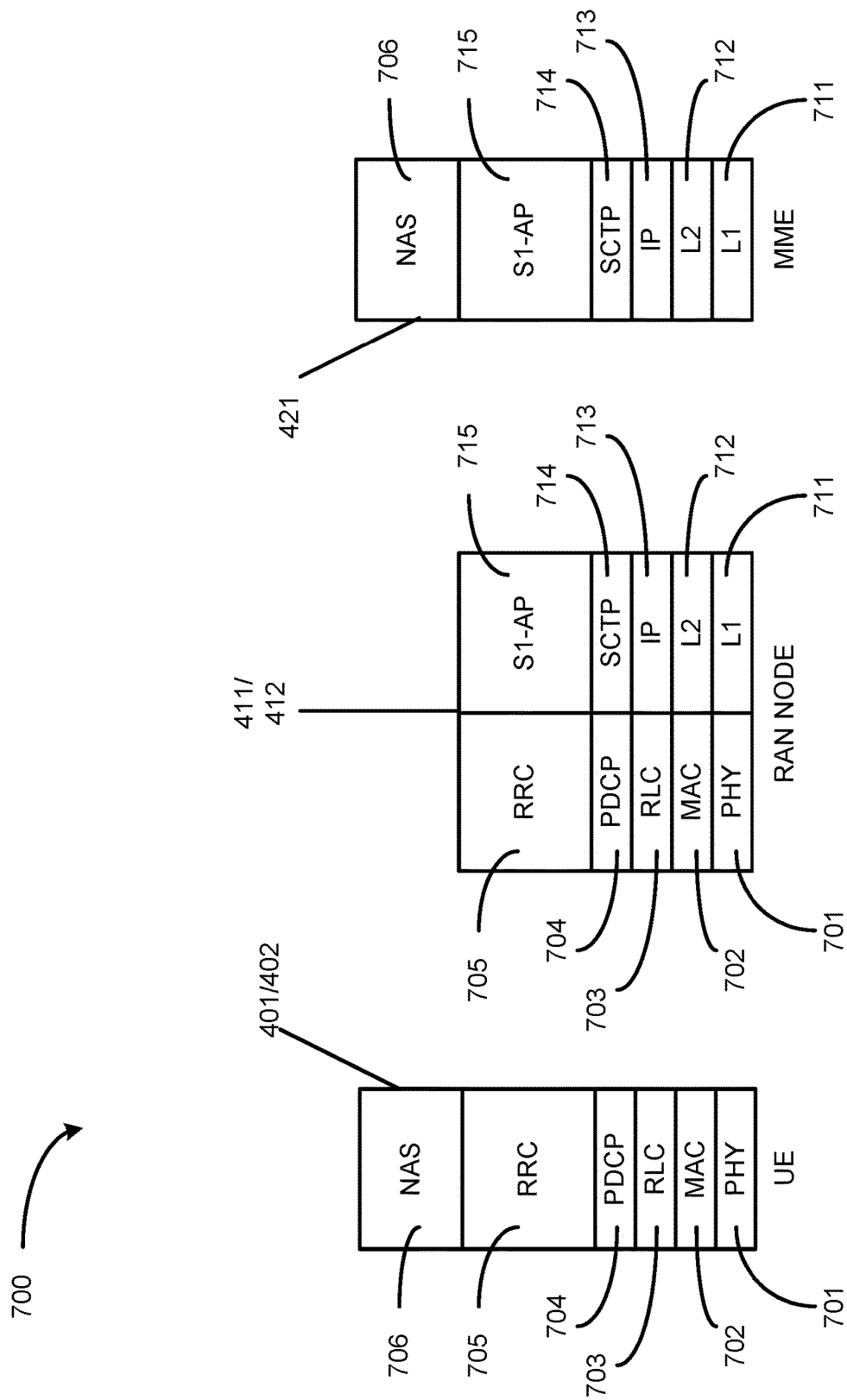
FIG. 7 is an illustration of a control plane protocol stack in accordance with some embodiments.

FIG. 7 is an illustration of a control plane protocol stack in accordance with some embodiments. In this embodiment, a control plane 700 is shown as a communications protocol stack between the UE 401 (or alternatively, the UE 402), the RAN node 411 (or alternatively, the RAN node 412), and the MME 421.

The PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 401 and the RAN node 411 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

The non-access stratum (NAS) protocols 706 form the highest stratum of the control plane between the UE 401 and the MME 421. The NAS protocols 706 support the mobility of the UE 401 and the session management procedures to establish and maintain IP connectivity between the UE 401 and the P-GW 423.

The S1 Application Protocol (S1-AP) layer 715 may support the functions of the S1 interface and comprise Elementary Procedures (EPs). An EP is a unit of interaction between the RAN node 411 and the CN 420. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 714 may ensure reliable delivery of signaling messages between the RAN node 411 and the MME 421 based, in part, on the IP protocol, supported by the IP layer 713. The L2 layer 712 and the L1 layer 711 may refer to communication links (e.g., wired or wireless) used by the RAN node and the MME to exchange information.

The RAN node 411 and the MME 421 may utilize an S1-MME interface to exchange control plane data via a protocol stack comprising the L1 layer 711, the L2 layer 712, the IP layer 713, the SCTP layer 714, and the S1-AP layer 715.

Figure 8:
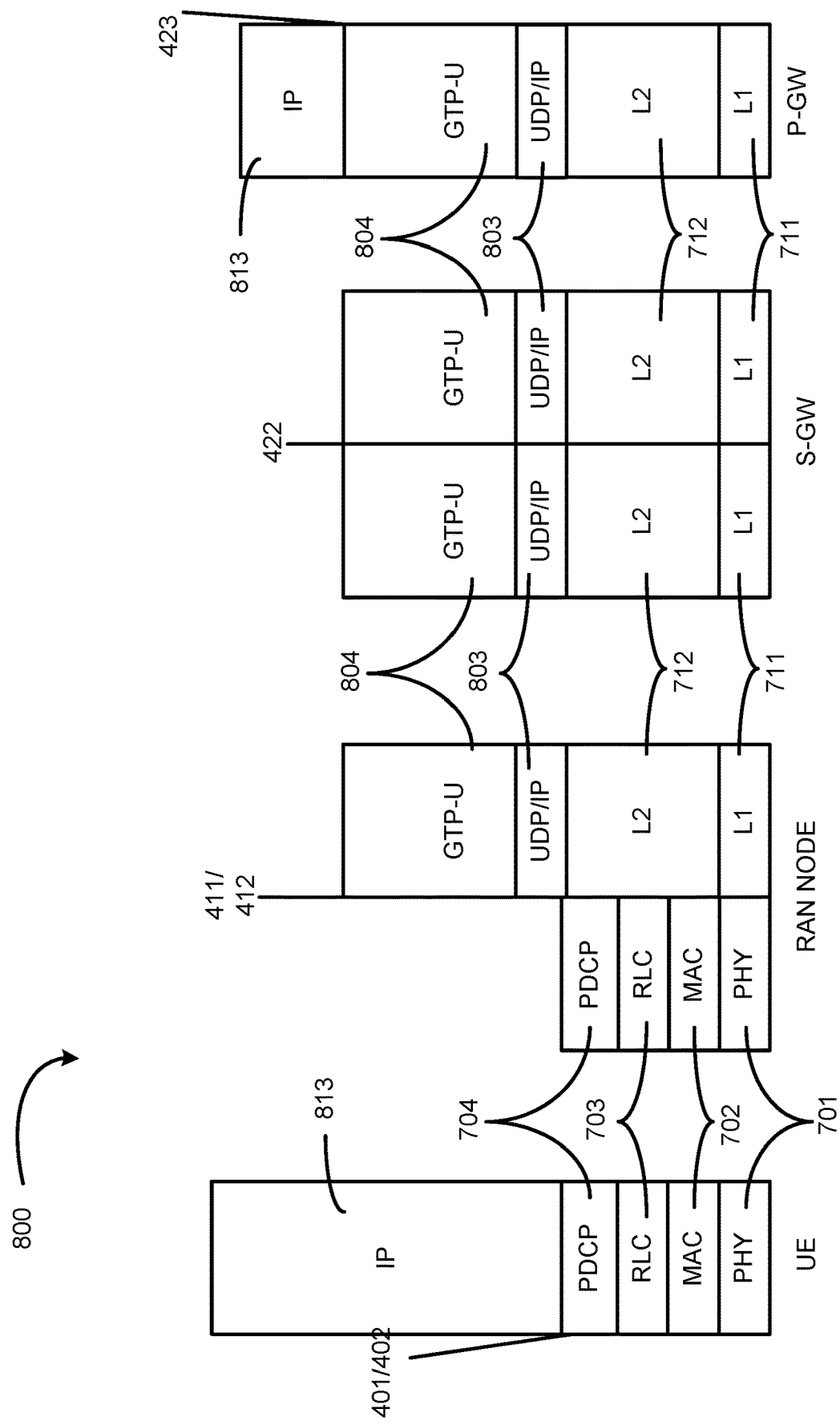
FIG. 8 is an illustration of a user plane protocol stack in accordance with some embodiments.

FIG. 8 is an illustration of a user plane protocol stack in accordance with some embodiments. In this embodiment, a user plane 800 is shown as a communications protocol stack between the UE 401 (or alternatively, the UE 402), the RAN node 411 (or alternatively, the RAN node 412), the S-GW 422, and the P-GW 423. The user plane 800 may utilize at least some of the same protocol layers as the control plane 700. For example, the UE 401 and the RAN node 411 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 411 and the S-GW 422 may utilize an S1-U interface to exchange user plane data via a protocol stack comprising the L1 layer 711, the L2 layer 712, the UDP/IP layer 803, and the GTP-U layer 804. The S-GW 422 and the P-GW 423 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols support the mobility of the UE 401 and the session management procedures to establish and maintain IP connectivity between the UE 401 and the P-GW 423.

Figure 9:
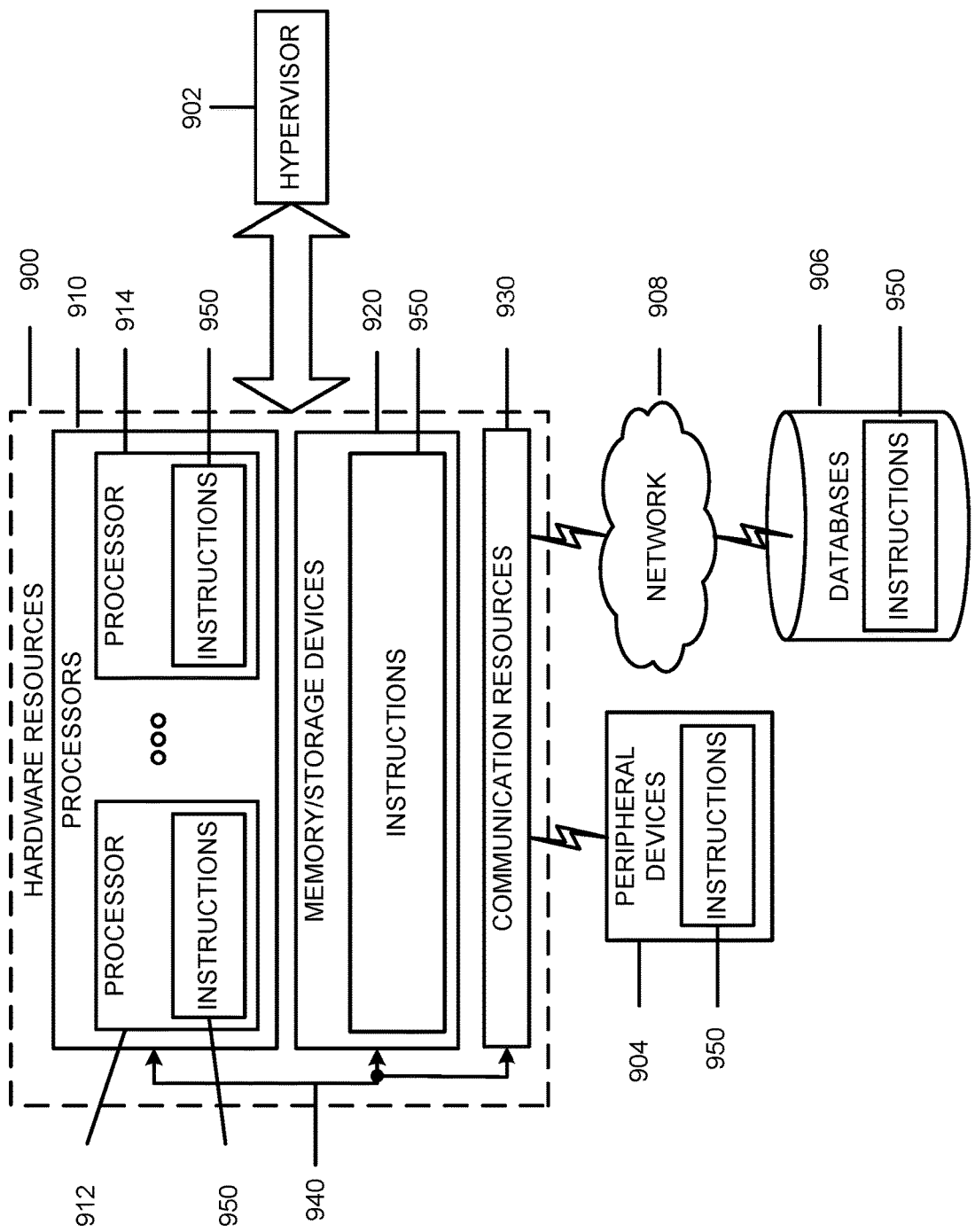
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

EXAMPLES

The following examples pertain to specific technology embodiments and point out specific features or elements that may be used or otherwise combined in achieving such embodiments.

Example 1 may include an apparatus of a user equipment (UE) operable to configure transmission power for physical uplink shared channel (PUSCH), the apparatus comprising: a processor configured to: receive, at the UE, a sounding reference signal (SRS) resource indicator that indicates one of a set of SRS resources; decode, at the UE, higher layer signaling including sets of one or more power control factors and a set of downlink reference signals, wherein each of the set of SRS resources is associated with one set of the one or more power control factors and one of the downlink reference signals; estimate, at the UE, a path loss based on the downlink reference signal corresponding to the SRS resource indicated by the SRS resource indicator; and determine, at the UE, a transmission power for the PUSCH based on the estimated path loss and the set of the one or more power control factors corresponding to the SRS resource indicated by the SRS resource indicator; and a memory interface, wherein an indicator of the determined transmission power is sent to a memory via the memory interface.

In Example 2, the subject matter of Example 1 or any of the Examples described herein may further include wherein the higher layer signaling is Radio Resource Control (RRC) signaling or Medium Access Control (MAC) Control Element (CE).

In Example 3, the subject matter of Example 1 or any of the Examples described herein may further include wherein the transmission power for the PUSCH is further determined based on the number of allocated subcarriers or resource blocks (RBs) for the PUSCH based on a reference subcarrier spacing or current subcarrier spacing for the UE.

In Example 4, the subject matter of Example 1 or any of the Examples described herein may further include wherein the one or more power control factors includes one or more of a resource block power, a path loss compensation factor, and a closed-loop power control factor.

In Example 5, the subject matter of Example 4 or any of the Examples described herein may further include wherein one or more of the resource block power, the path loss compensation factor, and the closed-loop power control factor are different in different SRS resources.

In Example 6, the subject matter of Example 1 or any of the Examples described herein may further include wherein the downlink reference signal for path loss estimation includes a channel state information reference signal (CSI-RS) or a synchronization signal block (SS-block) that is configured for each SRS resource.

In Example 7, the subject matter of Example 1 or any of the Examples described herein may further include wherein the UE is configured with multiple bandwidth parts (BWPs) or multiple component carriers (CCs), and the bandwidth part (BWP) index and the component carrier (CC) index for the downlink reference signal for path loss estimation is configured by higher layer signaling and mapped to each SRS resource.

In Example 8, the subject matter of Example 4 or any of the Examples described herein may further include wherein the closed-loop power control factor is indicated by a downlink control indicator (DCI), where multiple transmission power control (TPC)-commands are indicated.

In Example 9, the subject matter of Example 8 or any of the Examples described herein may further include wherein the UE is configured with a TPC-index, and uses the N consecutive TPC-Commands in the DCI starting from the TPC-Command k, where k is the value of TPC-index, and N is the number of closed-loop power control processes.

In Example 10, the subject matter of Example 9 or any of the Examples described herein may further include wherein an index for power control process is determined by cyclical redundancy check (CRC) sequence for physical downlink control channel (PDCCH) carrying the DCI for TPC-Command indication.

In Example 11, the subject matter of Example 9 or any of the Examples described herein may further include wherein N TPC-indexes are configured for the UE to search its TPC-Command for N power control processes, and each TPC-index is used for each power control process.

Example 12 may include an apparatus of a user equipment (UE) operable to configure transmission power for sounding reference signal (SRS), the apparatus comprising: a processor configured to: receive, at the UE, a SRS resource set index that indicates a SRS resource set; decode, at the UE, higher layer signaling including a set of one or more power control factors common for the SRS resource set; estimate, at the UE, a path loss for the SRS resource set; and determine, at the UE, a transmission power for the SRS based on the estimated path loss and the set of the one or more power control factors for the SRS resource set; and a memory interface, wherein an indicator of the determined transmission power is sent to a memory via the memory interface.

In Example 13, the subject matter of Example 12 or any of the Examples described herein may further include wherein the SRS resource set index is configured by higher layer signaling or downlink control information (DCI).

In Example 14, the subject matter of Example 12 or any of the Examples described herein may further include wherein the transmission power for the SRS is further determined based on the number of allocated subcarriers or resource blocks (RBs) for the SRS based on a reference subcarrier spacing or current subcarrier spacing for the UE.

In Example 15, the subject matter of Example 12 or any of the Examples described herein may further include wherein the one or more power control factors includes one or more of a resource block power, a path loss compensation factor, and a closed-loop power control factor.

In Example 16, the subject matter of Example 15 or any of the Examples described herein may further include wherein one or more of the resource block power, the path loss compensation factor, and the closed-loop power control factor are different in different SRS resource sets.

In Example 17, the subject matter of Example 12 or any of the Examples described herein may further include wherein the path loss is estimated based on a downlink reference signal.

In Example 18, the subject matter of Example 17 or any of the Examples described herein may further include wherein the downlink reference signal includes a channel state information reference signal (CSI-RS) or a synchronization signal block (SS-block) that is configured for each SRS resource set.

In Example 19, the subject matter of Example 12 or any of the Examples described herein may further include wherein if the SRS resource set is used for beam management, the path loss is estimated based on one of a cell-level Reference Signal Receiving Power (RSRP) and a downlink reference signal.

In Example 20, the subject matter of Example 17 or any of the Examples described herein may further include wherein the UE is configured with multiple bandwidth parts (BWPs) or multiple component carriers (CCs), and the bandwidth part (BWP) index and the component carrier (CC) index for the downlink reference signal is configured by higher layer signaling for each SRS resource set.

In Example 21, the subject matter of Example 15 or any of the Examples described herein may further include wherein the closed-loop power control factor is indicated by a downlink control indicator (DCI), where multiple transmission power control (TPC)-commands are indicated.

In Example 22, the subject matter of Example 21 or any of the Examples described herein may further include wherein the UE is configured with a TPC-index, and uses the N consecutive TPC-Commands in the DCI starting from the TPC-Command k, where k is the value of TPC-index, and N is the number of closed-loop power control processes.

In Example 23, the subject matter of Example 22 or any of the Examples described herein may further include wherein an index for the power control process is determined by cyclical redundancy check (CRC) sequence for physical downlink control channel (PDCCH) carrying the DCI for TPC-Command indication.

In Example 24, the subject matter of Example 22 or any of the Examples described herein may further include wherein N TPC-indexes are configured for the UE to search its TPC-Command for N power control processes, and each TPC-index is used for each power control process.

Example 25 may include a method to be performed by a user equipment (UE) of configuring transmission power for physical uplink shared channel (PUSCH), the method comprising: receiving, at the UE, a sounding reference signal (SRS) resource indicator that indicates one of a set of SRS resources; decoding, at the UE, higher layer signaling including sets of one or more power control factors and a set of downlink reference signals, wherein each of the set of SRS resources is associated with one set of the one or more power control factors and one of the downlink reference signals; estimating, at the UE, a path loss based on the downlink reference signal corresponding to the SRS resource indicated by the SRS resource indicator; and determining, at the UE, a transmission power for the PUSCH based on the estimated path loss and the set of the one or more power control factors corresponding to the SRS resource indicated by the SRS resource indicator.

In Example 26, the subject matter of Example 25 or any of the Examples described herein may further include wherein the higher layer signaling is Radio Resource Control (RRC) signaling or Medium Access Control (MAC) Control Element (CE).

In Example 27, the subject matter of Example 25 or any of the Examples described herein may further include wherein the transmission power for the PUSCH is further determined based on the number of allocated subcarriers or resource blocks (RBs) for the PUSCH based on a reference subcarrier spacing or current subcarrier spacing for the UE.

In Example 28, the subject matter of Example 25 or any of the Examples described herein may further include wherein the one or more power control factors includes one or more of a resource block power, a path loss compensation factor, and a closed-loop power control factor.

In Example 29, the subject matter of Example 28 or any of the Examples described herein may further include wherein one or more of the resource block power, the path loss compensation factor, and the closed-loop power control factor are different in different SRS resources.

In Example 30, the subject matter of Example 25 or any of the Examples described herein may further include wherein the downlink reference signal for path loss estimation includes a channel state information reference signal (CSI-RS) or a synchronization signal block (SS-block) that is configured for each SRS resource.

In Example 31, the subject matter of Example 25 or any of the Examples described herein may further include wherein the UE is configured with multiple bandwidth parts (BWPs) or multiple component carriers (CCs), and the bandwidth part (BWP) index and the component carrier (CC) index for the downlink reference signal for path loss estimation is configured by higher layer signaling and mapped to each SRS resource.

In Example 32, the subject matter of Example 28 or any of the Examples described herein may further include wherein the closed-loop power control factor is indicated by a downlink control indicator (DCI), where multiple transmission power control (TPC)-commands are indicated.

In Example 33, the subject matter of Example 32 or any of the Examples described herein may further include wherein the UE is configured with a TPC-index, and uses the N consecutive TPC-Commands in the DCI starting from the TPC-Command k, where k is the value of TPC-index, and N is the number of closed-loop power control processes.

In Example 34, the subject matter of Example 33 or any of the Examples described herein may further include wherein an index for power control process is determined by cyclical redundancy check (CRC) sequence for physical downlink control channel (PDCCH) carrying the DCI for TPC-Command indication.

In Example 35, the subject matter of Example 33 or any of the Examples described herein may further include wherein N TPC-indexes are configured for the UE to search its TPC-Command for N power control processes, and each TPC-index is used for each power control process.

Example 36 may include a method to be performed by a user equipment (UE) of configuring transmission power for sounding reference signal (SRS), the method comprising: receiving, at the UE, a SRS resource set index that indicates a SRS resource set; decoding, at the UE, higher layer signaling including a set of one or more power control factors common for the SRS resource set; estimating, at the UE, a path loss for the SRS resource set; and determining, at the UE, a transmission power for the SRS based on the estimated path loss and the set of the one or more power control factors for the SRS resource set.

In Example 37, the subject matter of Example 36 or any of the Examples described herein may further include wherein the SRS resource set index is configured by higher layer signaling or downlink control information (DCI).

In Example 38, the subject matter of Example 36 or any of the Examples described herein may further include wherein the transmission power for the SRS is further determined based on the number of allocated subcarriers or resource blocks (RBs) for the SRS based on a reference subcarrier spacing or current subcarrier spacing for the UE.

In Example 39, the subject matter of Example 36 or any of the Examples described herein may further include wherein the one or more power control factors includes one or more of a resource block power, a path loss compensation factor, and a closed-loop power control factor.

In Example 40, the subject matter of Example 39 or any of the Examples described herein may further include wherein one or more of the resource block power, the path loss compensation factor, and the closed-loop power control factor are different in different SRS resource sets.

In Example 41, the subject matter of Example 36 or any of the Examples described herein may further include wherein the path loss is estimated based on a downlink reference signal.

In Example 42, the subject matter of Example 41 or any of the Examples described herein may further include wherein the downlink reference signal includes a channel state information reference signal (CSI-RS) or a synchronization signal block (SS-block) that is configured for each SRS resource set.

In Example 43, the subject matter of Example 36 or any of the Examples described herein may further include wherein if the SRS resource set is used for beam management, the path loss is estimated based on one of a cell-level Reference Signal Receiving Power (RSRP) and a downlink reference signal.

In Example 44, the subject matter of Example 42 or any of the Examples described herein may further include wherein the UE is configured with multiple bandwidth parts (BWPs) or multiple component carriers (CCs), and the bandwidth part (BWP) index and the component carrier (CC) index for the downlink reference signal is configured by higher layer signaling for each SRS resource set.

In Example 45, the subject matter of Example 39 or any of the Examples described herein may further include wherein the closed-loop power control factor is indicated by a downlink control indicator (DCI), where multiple transmission power control (TPC)-commands are indicated.

In Example 46, the subject matter of Example 45 or any of the Examples described herein may further include wherein the UE is configured with a TPC-index, and uses the N consecutive TPC-Commands in the DCI starting from the TPC-Command k, where k is the value of TPC-index, and N is the number of closed-loop power control processes.

In Example 47, the subject matter of Example 45 or any of the Examples described herein may further include wherein an index for the power control process is determined by cyclical redundancy check (CRC) sequence for physical downlink control channel (PDCCH) carrying the DCI for TPC-Command indication.

In Example 48, the subject matter of Example 45 or any of the Examples described herein may further include wherein N TPC-indexes are configured for the UE to search its TPC-Command for N power control processes, and each TPC-index is used for each power control process.

Example 49 may include one or more non-transitory computer-readable media comprising instructions that, when executed by one or more processors of an electronic device, to cause the electronic device to perform a method of any of Examples 36-48, or any other method described herein.

Example 50 may include a system comprising means to perform one or more elements of a method of any of Examples 36-48, or any other method described herein.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

The invention claimed is:

1. An apparatus of a user equipment (UE) operable to configure transmission power for physical uplink shared channel (PUSCH), the apparatus comprising:
processing circuitry, wherein for PUSCH transmissions on frequencies greater than 6 GHz, the processing circuitry is to configure the UE to use more than one beam pair link (BPL), and
wherein for PUSCH transmissions on frequencies greater than 6 GHz, the processing circuitry is configured to:
receive, at the UE, a sounding reference signal (SRS) resource indicator that indicates two SRS resources of a set of SRS resources, the two SRS resources associated with two beam pair links (BPLs);
decode, at the UE, higher layer signaling including sets of one or more power control factors and a set of downlink reference signals, wherein each of the set of SRS resources is associated with one set of the one or more power control factors and one of the downlink reference signals;
estimate, at the UE, a path loss based on the downlink reference signal corresponding to the two SRS resources indicated by the SRS resource indicator; and
determine, at the UE, a transmission power for the PUSCH for transmission on frequencies greater than 6 GHz based on the path loss and the set of the one or more power control factors corresponding to the two SRS resources indicated by the SRS resource indicator, wherein the PUSCH is transmitted on a BPL associated with each of the two SRS resources; and
a memory interface, wherein an indicator of the transmission power is sent to a memory via the memory interface;
wherein for the frequencies greater than 6 GHz, the UE is configured for transmission of the PUSCH within one or multiple bandwidth parts (BWPs) of a component carrier, and wherein a bandwidth part (BWP) index and a component carrier (CC) index for the downlink reference signal for path loss estimation is configured by higher layer signaling and mapped to each SRS resource.

2. The apparatus of claim 1, wherein the higher layer signaling is Radio Resource Control (RRC) signaling or Medium Access Control (MAC) Control Element (CE).

3. The apparatus of claim 1, wherein the transmission power for the PUSCH is further determined based on a number of allocated subcarriers or resource blocks (RBs) for the PUSCH based on a reference subcarrier spacing or current subcarrier spacing for the UE.

4. The apparatus of claim 1, wherein the one or more power control factors includes one or more of a resource block power, a path loss compensation factor, and a closed-loop power control factor.

5. The apparatus of claim 4, wherein one or more of the resource block power, the path loss compensation factor, and the closed-loop power control factor are different in different SRS resources.

6. The apparatus of claim 1, wherein the downlink reference signal for path loss estimation includes a channel state information reference signal (CSI-RS) or a synchronization signal block (SS-block) that is configured for each SRS resource.

7. The apparatus of claim 4, wherein the closed-loop power control factor is indicated by a downlink control indicator (DCI), where multiple transmission power control (TPC)-commands are indicated.

8. The apparatus of claim 7, wherein the UE is configured with a TPC-index, and uses N consecutive TPC-Commands in the DCI starting from the TPC-Command k, where k is the value of TPC-index, and N is a number of closed-loop power control processes.

9. The apparatus of claim 8, wherein an index for power control process is determined by cyclical redundancy check (CRC) sequence for physical downlink control channel (PDCCH) carrying the DCI for TPC-Command indication.

10. The apparatus of claim 8, wherein N TPC-indexes are configured for the UE to search its TPC-Command for N power control processes, and each TPC-index is used for each power control process.

11. A method for operating a user equipment (UE) to configure transmission power for physical uplink shared channel (PUSCH), the method comprising:
  for PUSCH transmissions on frequencies greater than 6 GHz:
    configuring the UE to use more than one beam pair link (BPL);
    receiving a sounding reference signal (SRS) resource indicator that indicates two SRS resources of a set of SRS resources, the two SRS resources associated with two beam pair links (BPLs);
    decoding higher layer signaling including sets of one or more power control factors and a set of downlink reference signals, wherein each of the set of SRS resources is associated with one set of the one or more power control factors and one of the downlink reference signals;
    estimating a path loss based on the downlink reference signal corresponding to the two SRS resources indicated by the SRS resource indicator; and
    determining a transmission power for the PUSCH for transmission on frequencies greater than 6 GHz based on the path loss and the set of the one or more power control factors corresponding to the two SRS resources indicated by the SRS resource indicator, wherein the PUSCH is transmitted on a BPL associated with each of the two SRS resources; and
  sending an indicator of the transmission power to a memory via a memory interface of the UE; and
  for the frequencies greater than 6 GHz, configuring the UE for transmission of the PUSCH within one or multiple bandwidth parts (BWPs) of a component carrier, and wherein a bandwidth part (BWP) index and a component carrier (CC) index for the downlink reference signal for path loss estimation is configured by higher layer signaling and mapped to each SRS resource.

12. The method of claim 11, wherein the higher layer signaling is Radio Resource Control (RRC) signaling or Medium Access Control (MAC) Control Element (CE).

13. The method of claim 11, wherein the transmission power for the PUSCH is further determined based on a number of allocated subcarriers or resource blocks (RBs) for the PUSCH based on a reference subcarrier spacing or current subcarrier spacing for the UE.

14. The method of claim 11, wherein the one or more power control factors includes one or more of a resource block power, a path loss compensation factor, and a closed-loop power control factor.

15. The method of claim 11, wherein the downlink reference signal for path loss estimation includes a channel state information reference signal (CSI-RS) or a synchronization signal block (SS-block) that is configured for each SRS resource.

16. A non-transitory memory medium for operating a user equipment (UE), wherein the memory medium stores instructions enabling the UE to configure transmission power for physical uplink shared channel (PUSCH), wherein the instructions, when executed by one or more processors, cause the processors to implement:
  for PUSCH transmissions on frequencies greater than 6 GHz:
    configuring the UE to use more than one beam pair link (BPL);
    receiving a sounding reference signal (SRS) resource indicator that indicates two SRS resources of a set of SRS resources, the two SRS resources associated with two beam pair links (BPLs);
    decoding higher layer signaling including sets of one or more power control factors and a set of downlink reference signals, wherein each of the set of SRS resources is associated with one set of the one or more power control factors and one of the downlink reference signals;
    estimating a path loss based on the downlink reference signal corresponding to the two SRS resources indicated by the SRS resource indicator; and
    determining a transmission power for the PUSCH for transmission on frequencies greater than 6 GHz based on the path loss and the set of the one or more power control factors corresponding to the two SRS resources indicated by the SRS resource indicator, wherein the PUSCH is transmitted on a BPL associated with each of the two SRS resources; and
  sending an indicator of the transmission power to a memory via a memory interface of the UE; and
  for the frequencies greater than 6 GHz, configuring the UE for transmission of the PUSCH within one or multiple bandwidth parts (BWPs) of a component carrier, and wherein a bandwidth part (BWP) index and a component carrier (CC) index for the downlink reference signal for path loss estimation is configured by higher layer signaling and mapped to each SRS resource.

17. The non-transitory memory medium of claim 16, wherein the higher layer signaling is Radio Resource Control (RRC) signaling or Medium Access Control (MAC) Control Element (CE).

18. The non-transitory memory medium of claim 16, wherein the transmission power for the PUSCH is further determined based on a number of allocated subcarriers or resource blocks (RBs) for the PUSCH based on a reference subcarrier spacing or current subcarrier spacing for the UE.

19. The non-transitory memory medium of claim 16, wherein the one or more power control factors includes one or more of a resource block power, a path loss compensation factor, and a closed-loop power control factor.

20. The non-transitory memory medium of claim 16, wherein the downlink reference signal for path loss estimation includes a channel state information reference signal (CSI-RS) or a synchronization signal block (SS-block) that is configured for each SRS resource.

* * * * *